(12) United States Patent
Yoshimaru et al.

(10) Patent No.: US 10,661,528 B2
(45) Date of Patent: May 26, 2020

(54) SEPARATOR AND SECONDARY BATTERY INCLUDING THE SEPARATOR

(71) Applicant: Sumitomo Chemical Company, Limited, Tokyo (JP)

(72) Inventors: Chikae Yoshimaru, Osaka (JP); Chikara Murakami, Osaka (JP); Takahiro Okugawa, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/344,149

(22) PCT Filed: Oct. 24, 2016

(86) PCT No.: PCT/JP2016/081481
§ 371 (c)(1),
(2) Date: Apr. 23, 2019

(87) PCT Pub. No.: WO2018/078704
PCT Pub. Date: May 3, 2018

(65) Prior Publication Data
US 2020/0070470 A1    Mar. 5, 2020

(51) Int. Cl.
*H01M 2/16* (2006.01)
*H01M 10/0525* (2010.01)
(Continued)

(52) U.S. Cl.
CPC ............. *B32B 5/24* (2013.01); *H01M 2/1653* (2013.01); *H01M 2/1686* (2013.01); *H01M 10/0525* (2013.01); *C08J 9/26* (2013.01)

(58) Field of Classification Search
None
See application file for complete search history.

(56) References Cited

U.S. PATENT DOCUMENTS

2012/0268072 A1   10/2012   Okuno
2013/0337311 A1   12/2013   Itou
(Continued)

FOREIGN PATENT DOCUMENTS

JP    2012227066 A    11/2012
JP      5164296 B2     3/2013
(Continued)

OTHER PUBLICATIONS

Written Opinion dated Jan. 10, 2017 in International Application No. PCT/JP2016/081481, translation only.
(Continued)

*Primary Examiner* — Christopher P Domone
(74) *Attorney, Agent, or Firm* — Panitch Schwarze Belisario & Nadel LLP (57) ABSTRACT

Provided is a separator including a first later consisting of a porous polyolefin and a secondary battery utilizing the separator. The first layer exhibits a temperature-increase convergence time equal to or longer than 2.9 s·m$^2$/g and equal to or shorter than 5.7 s·m$^2$/g when the first layer is irradiated with a microwave having a frequency of 2455 MHz and an output power of 1800 W after being dipped in N-methylpyrrolidone containing 3 wt % of water. A minimum height of a ball placed over the first layer and having a diameter of 14.3 mm and a weight of 11.9 g is equal to or more than 50 cm and equal to or less than 150 cm, the minimum height causing a split in the first layer when the ball freely falls on the first layer.

7 Claims, 5 Drawing Sheets

(51) Int. Cl.
*B32B 5/24* (2006.01)
*C08J 9/26* (2006.01)

(56) References Cited

U.S. PATENT DOCUMENTS

2015/0155541 A1* 6/2015 Hasegawa ................ B32B 5/18
429/144
2017/0155120 A1 6/2017 Yoshimaru et al.

FOREIGN PATENT DOCUMENTS

| JP | 2015120835 A | 7/2015 |
| JP | 6012838 B1 | 10/2016 |
| KR | 20150032555 A | 3/2015 |
| WO | 2012090632 A1 | 7/2012 |

OTHER PUBLICATIONS

International Search Report dated Jan. 10, 2017 in International Application No. PCT/JP2016/081481.
Written Opinion dated Jan. 10, 2017 in International Application No. PCT/JP2016/081481.
Office Action dated Aug. 29, 2019 in KR Application No. 1020197013298 (Partial English Translation).

* cited by examiner

SEPARATOR AND SECONDARY BATTERY INCLUDING THE SEPARATOR

CROSS-REFERENCE TO RELATED APPLICATIONS

This application is a Section 371 of International Application No. PCT/JP2016/081481, filed Oct. 24, 2016, which was published in the Japanese language on May 3, 2018 under International Publication No. WO 2018/078704 A1, the disclosure of which is incorporated herein by reference in its entirety.

FIELD

An embodiment of the present invention relates to a separator and a secondary battery including the separator. For example, an embodiment of the present invention relates to a separator capable of being used in a nonaqueous electrolyte-solution secondary battery and a nonaqueous electrolyte-solution secondary battery including the separator.

BACKGROUND

As a typical example of a nonaqueous electrolyte-solution secondary battery, a lithium ion secondary battery is represented. Since a lithium-ion secondary battery has a high energy density, it has been widely used in electronic devices such as a personal computer, a mobile phone, and a mobile information terminal. A lithium ion secondary battery includes a positive electrode, a negative electrode, an electrolyte solution charged between the positive electrode and the negative electrode, and a separator. The separator separates the positive electrode and the negative electrode from each other and also functions as a film transmitting the electrolyte solution and carrier ions. For example, patent literature 1 to 3 disclose a separator including a polyolefin.

CITATION LIST

PATENT LITERATURE

Patent Literature 1: Japanese Patent Application Publication No. 2015-120835
Patent Literature 2: Japanese Patent No. 5164296
Patent Literature 3: Japanese Patent Application Publication No. 2012-227066

SUMMARY

An object of the present invention is to provide a separator capable of being used in a secondary battery such as a nonaqueous electrolyte-solution secondary battery and a secondary battery including the separator. Alternatively, an object of the present invention is to provide a separator allowing high-yield production of a secondary battery in which reduction in battery performance is suppressed when charging/discharging is repeated and to provide a secondary battery including the separator.

An embodiment of the present invention is a separator including a first layer which consists of a porous polyolefin. A temperature-increase convergence time of the first layer is equal to or longer than 2.9 s·m²/g and equal to or shorter than 5.7 s·m²/g when the first layer is irradiated with a microwave having a frequency of 2455 MHz and an output power of 1800 W after being dipped in N-methylpyrrolidone containing 3 wt % of water, and a minimum height of a ball having a diameter of 14.3 mm and a weight of 11.9 g and located over the first layer is equal to or more than 50 cm and equal to or less than 150 cm when the ball is allowed to fall freely causing a split in the first layer.

EFFECTS OF INVENTION

According to the present invention, it is possible to provide a separator which not only possesses an excellent slip property and trimming processability but also enables production of a secondary battery in which a reduction in battery performance is suppressed when charging/discharging is repeated.

DESCRIPTION OF EMBODIMENTS

Hereinafter, the embodiments of the present invention are explained with reference to the drawings and the like. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, they are only an example, and do not limit the interpretation of the invention.

In the specification and the claims, unless specifically stated, when a state is expressed where a structure is arranged "on" another structure, such an expression includes both a case where the substrate is arranged immediately above the "other structure" so as to be in contact with the "other structure" and a case where the structure is arranged over the "other structure" with an additional structure therebetween.

In the specification and the claims, an expression "substantially including only A" includes a state where no substance is included other than A, a state where A and an impurity are included, and a state misidentified as a state where a substance other than A is included due to a measurement error. When this expression means the state where A and an impurity are included, there is no limitation to the kind and concentration of the impurity.

First Embodiment

Figure 1A:
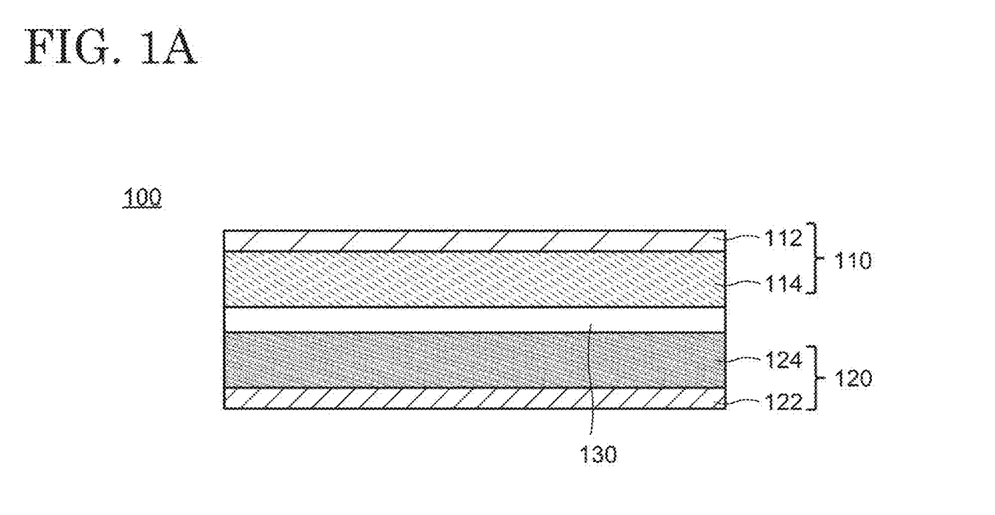
FIG. 1A and FIG. 1B are respectively schematic cross-sectional views of a secondary battery and a separator according to an embodiment of the present invention.

A schematic cross-sectional view of a secondary battery 100 according to an embodiment of the present invention is shown in FIG. 1A. The secondary battery 100 includes a positive electrode 110, a negative electrode 120, and a separator 130 separating the positive electrode 110 and the negative electrode 120 from each other. Although not illustrated, the secondary battery 100 possesses an electrolyte solution 140. The electrolyte solution 140 mainly exists in apertures of the positive electrode 110, the negative electrode 120, and the separator 130 as well as in the gaps between these members. The positive electrode 110 may include a positive-electrode current collector 112 and a positive-electrode active-substance layer 114. Similarly, the negative electrode 120 may include a negative-electrode current collector 122 and a negative-electrode active-substance layer 124. Although not illustrated in FIG. 1A, the secondary battery 100 further possesses a housing by which the positive electrode 110, the negative electrode 120, the separator 130, and the electrolyte solution 140 are supported.

1. Separator 1-1. Structure

Figure 1B:
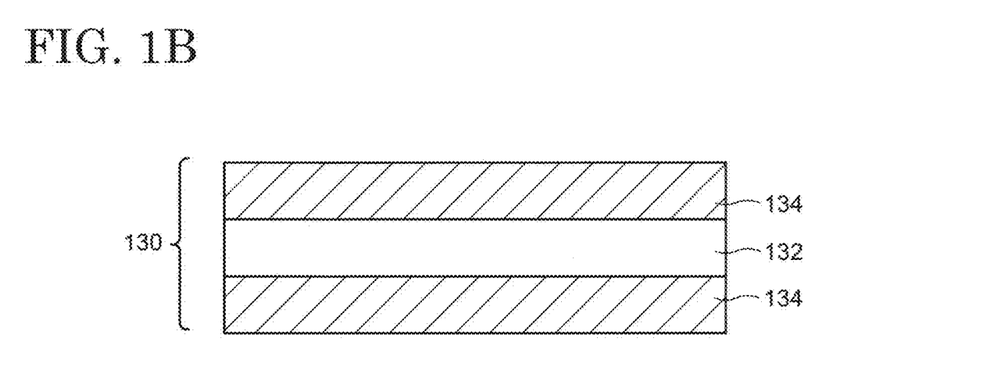

The separator 130 is disposed between the positive electrode 110 and the negative electrode 120 and serves as a film having a role of separating the positive electrode 110 and the negative electrode 120 and transporting the electrolyte solution 140 in the secondary battery 100. A schematic cross-sectional view of the separator 130 is shown in FIG. 1B. The separator 130 has a first layer 132 including a porous polyolefin and may further possess a porous layer 134 as an optional structure. The separator 130 may have a structure in which two porous layers 134 sandwich the first layer 132 as shown in FIG. 1B, or a structure in which the porous layer 134 is disposed only on one surface of the first layer 132. Alternatively, a structure may be employed where no porous layer 134 is provided. The first layer 132 may have a single-layer structure or may be structured with a plurality of layers.

The first layer 132 has internal pores linked to each other. This structure allows the electrolyte solution 140 to permeate the first layer 132 and enables carrier ions such as lithium ions to be transported via the electrolyte solution 140. At the same time, physical contact between the positive electrode 110 and the negative electrode 120 is inhibited. On the other hand, when the secondary battery 100 has a high temperature, the first layer 132 melts and the pores disappear, thereby stopping the transportation of the carrier ions. This behavior is called shutdown. This behavior prevents heat generation and ignition caused by a short-circuit between the positive electrode 110 and the negative electrode 120, by which high safety is secured.

The first layer 132 includes a porous polyolefin. Alternatively, the first layer 132 may be structured with a porous polyolefin. Namely, the first layer 132 may be configured so as to include only a porous polyolefin or substantially include only a porous polyolefin. The porous polyolefin may contain an additive. In this case, the first layer 132 may be structured only with the polyolefin and the additive or substantially only with the polyolefin and the additive. When the porous polyolefin contains the additive, the polyolefin may be included in the porous polyolefin at a composition equal to or higher than 95 wt % or equal to or higher than 97 wt %. Furthermore, the polyolefin may be included in the first layer 132 at a composition equal to or higher than 95 wt % or equal to or higher than 97 wt %. As the additive, an organic compound (organic additive) is represented, and the organic compound may be an antioxidant (organic antioxidant) or a lubricant.

As the polyolefin structuring the porous polyolefin, a homopolymer obtained by polymerizing an a-olefin such as ethylene, propylene, 1-butene, 4-methyl-1-pentene, and 1-hexene or a copolymer thereof is represented. A mixture of these homopolymers and copolymers or a mixture of the homopolymers or copolymers having different molecular weights may be included in the first layer 132. The organic additive may have a function to prevent oxidation of the polyolefin, and phenols or phosphoric esters may be employed as the organic additive, for example. Phenols having a bulky substituent at an a-position and/or a β-position of a phenolic hydroxy group may be also used.

As a typical polyolefin, a polyethylene-based polymer is represented. When a polyethylene-based polymer is used, a low-density polyethylene or a high-density polyethylene may be used. Alternatively, a copolymer of ethylene with an a-olefin may be used. These polymers or copolymers may be a high-molecular weight polymer with a weight-average molecular weight equal to or higher than 100,000 or an ultrahigh-molecular weight polymer with a weight-average molecular weight of equal to or higher than 1,000,000. The use of a polyethylene-based polymer enables the shutdown function to be realized at a lower temperature, thereby providing high safety to the secondary battery 100.

A thickness of the first layer 132 may be equal to or larger than 4 μm and equal to or smaller than 40 μm, equal to or larger than 5 μm and equal to or smaller than 30 μm, or equal to or larger than 6 μm and equal to or smaller than 15 μm.

A weight per unit area of the first layer 132 is appropriately determined in view of its strength, thickness, weight, and handleability. For example, the weight per unit area may be equal to or more than 4 $g/m^2$ and equal to or less than 20 $g/m^2$, equal to or more than 4 $g/m^2$ and equal to or less than 12 $g/m^2$, or equal to or more than 5 $g/m^2$ and equal to or less than 10 $g/m^2$, by which a weight-energy density and a volume-energy density of the secondary battery 100 can be increased. Note that a weight per unit area is a weight per unit area.

With respect to gas permeability of the first layer 132, its Gurley value may be selected from a range equal to or higher than 30 s/100 mL and equal to or lower than 500 s/100 mL or equal to or higher than 50 s/100 mL and equal to or lower than 300 s/100 mL so that sufficient ion-permeability can be obtained.

A porosity of the first layer 132 may be selected from a range equal to or more than 20 vol % and equal to or less than 80 vol %, equal to or more than 20 vol % and equal to or less than 75 vol %, equal to or more than 20 vol % and equal to or less than 55 vol %, equal to or more than 30 vol % and equal to or less than 55 vol %, or equal to or more than 40 vol % and equal to or less than 55 vol % so that a retention volume of the electrolyte solution 140 is increased and the shutdown function is surely realized. A diameter of the pore (average pore diameter) in the first layer 132 may be selected from a range equal to or larger than 0.01 μm and equal to or smaller than 0.3 μm or equal to or larger than 0.01 μm and equal to or smaller than 0.14 μm so that a sufficient ion-permeability and a high shutdown function can be obtained.

1-2. Property

A time per the weight per unit area of the first layer 132, which is required to converge a temperature increase caused by irradiating the first layer 132 with a microwave having a frequency of 2455 Hz and an output power of 1800 W after being dipped in N-methylpyrrolidone containing 3 wt % of water (hereinafter referred to as a temperature-increase convergence time), is equal to or longer than 2.9 $s \cdot m^2/g$ and equal to or shorter than 5.7 $s \cdot m^2/g$ or equal to or longer than 2.9 $s \cdot m^2/g$ and equal to or shorter than 5.3 $s \cdot m^2/g$. In addition, the first layer 132 has a minimum height of a ball in a falling-ball test equal to or more than 50 cm and equal to or less than 150 cm. As described in the Examples, the inventors found that the use of the separator 130 including the first layer 132 satisfying these properties allows production at a high yield of a secondary battery in which a decrease in battery performance is suppressed when charging/discharging is repeated.

The structure of the pores in the first layer 132 (capillary attraction in the pores and an area of the pore wall) and an ability to supply the electrolyte solution 140 from the first layer 132 to the electrodes (the positive electrode 110 and the negative electrode 120) relate to a decrease in battery performance when charging/discharging of the battery is repeated or the battery is operated at a large current. For example, the charging/discharging of the secondary battery 100 results in expansion of the electrodes. Specifically, the negative electrode expands during charging, while the positive electrode expands during discharging. Therefore, the electrolyte solution 140 included in the first layer 132 is extruded from the side of the expanding electrode to the side of the opposing electrode. The electrolyte solution 140 moves in the pores of the first layer 132 during charging/discharging due to this mechanism.

When the electrolyte solution 140 moves in the pores of the first layer 132, the wall surface of the pores receives a pressure from the electrolyte solution 140. The magnitude of the pressure relates to the structure of the pores. Specifically, it is considered that the pressure received by the wall surface of the pores increases with increasing capillary attraction and increasing area of the wall surface of the pores. In addition, the magnitude of the pressure also relates to the amount of the electrolyte solution 140 moving in the pores and increases when the amount of the moving electrolyte solution 140 is increased, that is, when the secondary battery 100 is operated at a large current. An increase in pressure causes deformation of the wall surface so as to close the pores by the pressure, which results in a reduction in battery-output property. Therefore, the battery performance gradually decreases by repeating charging/discharging of the secondary battery 100 or by operating the secondary battery 100 at a large current.

On the other hand, when the amount of the electrolyte solution 140 permeating the first layer 132 is small, the electrolyte solution 140 at a vicinity of the electrodes may be decreased, and the electrolyte solution 140 may decompose. Products resulting from decomposition of the electrolyte solution 140 lead to a reduction in battery performance of the secondary battery 100.

Here, when water-containing N-methylpyrrolidone is irradiated with a microwave, heat generates due to the vibration energy of water. The generated heat is conducted to the first layer 132 which is in contact with N-methylpyrrolidone. The increase in temperature of N-methylpyrrolidone converges when the heat-generating rate and a heat-radiating rate due to the heat conduction to the first layer 132 reach an equilibrium. Thus, the time required to converge the temperature increase (temperature-increase convergence time) relates to a degree of contact between the solvent included in the first layer 132 (here, the water-containing N-methylpyrrolidone) and the first layer 132. Since the degree of contact closely relates to the capillary attraction in the pores and the area of the wall surface of the pores of the first layer 132, it is possible to evaluate the structure of the pores using the temperature-increase convergence time. Specifically, a short temperature-increase convergence time indicates large capillary attraction in the pores and a large area of the wall of the pores.

In addition, the degree of contact is considered to increase with increasing movability of the electrolyte solution 140 in the pores of the first layer 132. Hence, it is possible to evaluate the ability to supply the electrolyte solution 140 from the first layer 132 to the positive electrode 110 and the negative electrode 120. Specifically, the ability to supply the electrolyte solution 140 increases with decreasing temperature-increase convergence time.

In the case where the temperature-increase convergence time of the first layer 132 is shorter than 2.9 s·m$^2$/g, the capillary attraction in the pores is too high and the area of the wall of the pores of the first layer 132 is too large, which leads to an increase in pressure applied to the wall of the pores by the electrolyte solution 140 moving in the pores during a charging/discharging cycle or during operation at a large current and results in the closing of the pores.

On the other hand, in the case where the temperature-increase convergence time exceeds 5.7 s·m$^2$/g, the solvent cannot readily move in the pores of the first layer 132, and the moving rate of the electrolyte solution decreases at a vicinity of the electrodes, which causes a reduction in battery performance of the battery. As a result, the internal resistance of the secondary battery 100 increases, the battery performance reduces after repeating charging/discharging, and the output property diminishes.

Accordingly, the first layer 132 is configured to have the temperature-increase convergence time equal to or longer than 2.9 s·m$^2$/g and equal to or shorter than 5.7 s·m$^2$/g or equal to or longer than 2.9 s·m$^2$/g and equal to or shorter than 5.3 s·m$^2$/g, thereby enabling production of the separator 130 capable of suppressing a decrease in battery performance when charging/discharging is repeated.

When the secondary battery is fabricated using the separator 130 including the first layer 132, the separator 130 is trimmed into a predetermined size. If a split occurs in an unintended direction during trimming, the yield of the secondary battery decreases. In addition, when a wound secondary battery is fabricated using the separator 130, the separator 130 and the electrodes (the positive electrode 110 and the negative electrode 120) are wound on a columnar member (hereinafter, referred to as a pin), and then the pin is extracted. At this time, if friction between the separator 130 and the pin is large, the pin cannot be readily extracted, thereby destroying the separator 130, the electrodes, or the pin. As a result, the manufacturing process is affected, and the yield is decreased. The inventors found that the minimum height of the ball in the falling-ball test has a relationship with trimming processability as well as friction between the first layer 132 and other members and greatly influences the yield. More specifically, it was proven that the separator 130 can be selectively cut in an intended direction and the friction with the pin can be reduced by configuring the first layer 132 so that the minimum height of the ball in the falling-ball test is equal to or more than 50 cm and equal to or less than 150 cm.

In the specification and claims, the falling-ball test is an evaluation test conducted as follows. A mirror-surface ball with a diameter of 14.3 mm and a weight of 11.9 g is subjected to a free fall on the first layer 132 from a height h. The height h is a distance between the ball immediately prior to the free fall and the first layer 132. The minimum height value of h which causes a split in the first layer 132 when the ball falls on the first layer 132 is the lowest value of the ball.

As described below, the first layer 132 is obtained by a rolling process. A hard and brittle skin layer is formed at a surface in the rolling process. In addition, a difference in orientation is generated in a rolling direction, depending on the rolling conditions. Specifically, an orientation difference arises between a flow direction (also called machine direction. Hereinafter, referred to as a MD) and a width direction (also called transverse direction. Hereinafter, referred to as a TD). Rolling in only the TD leads to an increase in an orientation in TD, while rolling in only the MD results in an increase in an orientation in the MD. A proportion of the skin layer and a MD-TD orientation balance relate to the split in the first layer 132. That is, the first layer 132 tends to become fragile to impact and to be readily split in an unintended direction with increasing proportion of the skin layer. Furthermore, when the orientation is biased in one of the MT and TD, a split readily occurs along the more strongly biased direction, and the friction in a direction perpendicular to the more strongly biased direction increases. Hence, the proportion of the skin layer and the orientation balance between the MD and TD influence the trimming processability and the friction of the first layer 132.

The inventors found that an increase in the minimum height of the ball in the falling-ball test results in a decrease in the proportion of the skin layer and in the orientation difference between the MD and TD. It was also found that, in the case where the minimum height is equal to or more than 50 cm, the split in an unintended direction is suppressed in forming the first layer 132, and the friction with other members is decreased. Note that it is necessary to thicken the first layer 132 or reduce porosity in order to increase the minimum height to be more than 150 cm. However, an increase in thickness reduces energy density of the secondary battery, and a decrease in porosity causes a decrease in battery performance. Hence, it is preferred that the minimum height be equal to or less than 150 cm.

Therefore, the secondary battery exhibiting a negligible decrease in battery performance 100 can be supplied at low cost by using the separator 130 including the first layer 132 which has the temperature-increase convergence time equal to or longer than 2.9 s·m$^2$/g and equal to or shorter than 5.7 s·m$^2$/g and exhibits the minimum height of a ball in the falling-ball test equal to or more than 50 cm and equal to or less than 150 cm.

2. Electrode

As described above, the positive electrode 110 may include the positive-electrode current collector 112 and the positive-electrode active-substance layer 114. Similarly, the negative electrode 120 may include the negative-electrode current collector 122 and the negative-electrode active-substance layer 124 (see FIG. 1A). The positive-electrode current collector 112 and the negative-electrode current collector 122 respectively possess the positive-electrode active-substance layer 114 and the negative-electrode active-substance layer 124 and have functions to supply current to the positive-electrode active-substance layer 114 and the negative-electrode active-substance layer 124, respectively.

A metal such as nickel, copper, titanium, tantalum, zinc, iron, and cobalt or an alloy such as stainless including these metals can be used for the positive-electrode current collector 112 and the negative-electrode current collector 122, for example. The positive-electrode current collector 112 and the negative-electrode current collector 122 may have a structure in which a plurality of layers including these metals is stacked.

The positive-electrode active-substance layer 114 and the negative-electrode active-substance layer 124 respectively include a positive-electrode active substance and a negative-electrode active substance. The positive-electrode active substance and the negative-electrode active substance have a role to release and absorb carrier ions such as lithium ions.

As a positive-electrode active substance, a material capable of being doped or de-doped with carrier ions is represented, for example. Specifically, a lithium-based composite oxide containing at least one kind of transition metals such as vanadium, manganese, iron, cobalt, and nickel is represented. As such a composite oxide, a lithium-based composite oxide having an α-NaFeO$_2$-type structure, such as lithium nickelate and lithium cobalate, and a lithium-based composite oxide having a spinel-type structure, such as lithium manganese spinel, are given. These composite oxides have a high average discharge potential.

The lithium-based composite oxide may contain another metal element and is exemplified by lithium nickelate (composite lithium nickelate) including an element selected from titanium, zirconium, cerium, yttrium, vanadium, chromium, manganese, iron, cobalt, copper, silver, magnesium, aluminum, gallium, indium, tin, and the like, for example. These metals may be adjusted to be equal to or more than 0.1 mol % and equal to or less than 20 mol % to the metal elements in the composite lithium nickelate. This structure provides the secondary battery 100 with an excellent rate property when used at a high capacity. For example, a composite lithium nickelate including aluminum or manganese and containing nickel at 85 mol % or more or 90 mol % or more may be used as the positive-electrode active substance.

Similar to the positive-electrode active substance, a material capable of being doped and de-doped with carrier ions can be used as the negative-electrode active substance. For example, a lithium metal or a lithium alloy is represented. Alternatively, it is possible to use a carbon-based material such as graphite exemplified by natural graphite and artificial graphite, cokes, carbon black, and a sintered polymeric compound exemplified by carbon fiber; a chalcogen-based compound capable of being doped and de-doped with lithium ions at a potential lower than that of the positive electrode, such as an oxide and a sulfide; an element capable of being alloyed or reacting with an alkaline metal, such as aluminum, lead, tin, bismuth, and silicon; an intermetallic compound of cubic system (AlSb, Mg$_2$Si, NiSi$_2$) undergoing alkaline-metal insertion between lattices; lithium-nitride compound (Li$_{3-x}$M$_x$N (M: transition metal)); and the like. Among the negative-electrode active substances, the carbon-based material including graphite such as natural graphite and artificial graphite as a main component provides a large energy density due to high potential uniformity and a low average discharge potential when combined with the positive electrode 110. For example, it is possible to use, as the negative-electrode active substance, a mixture of graphite and silicon with a ratio of silicon to carbon equal to or larger than 5 mol % and equal to or smaller 10 mol %.

The positive-electrode active-substance layer 114 and the negative-electrode active-substance layer 124 may each further include a conductive additive and binder other than the aforementioned positive-electrode active substance and the negative-electrode active substance.

As a conductive additive, a carbon-based material is represented. Specifically, graphite such as natural graphite and artificial graphite, cokes, carbon black, pyrolytic carbons, and a sintered polymeric compound such as carbon fiber are given. A plurality of materials described above may be mixed to use as a conductive additive.

As a binder, poly(vinylidene fluoride) (PVDF), polytetrafluoroethylene, poly(vinylidene fluoride-co-hexafluoropropylene), poly(tetrafluoroethylene-co-hexafluoropropylene), poly(tetrafluoroethylene-co- perfluoroalkyl vinyl ether), poly(ethylene-co-tetrafluoroethylene), a copolymer in which vinylidene fluoride is used as a monomer, such as a poly(vinylidene fluoride-co-hexafluoropropylene-co-tetrafluoroethylene), a thermoplastic resin such as a thermoplastic polyimide, polyethylene, and polypropylene, an acrylic resin, styrene-butadiene rubber, and the like are represented. Note that a binder may further have a function as a thickener.

The positive electrode 110 may be formed by applying a mixture of the positive-electrode active substance, the conductive additive, and the binder on the positive-electrode current collector 112, for example. In this case, a solvent may be used to form or apply the mixture. Alternatively, the positive electrode 110 may be formed by applying a pressure to the mixture of the positive-electrode active substance, the conductive additive, and the binder to process the mixture and arranging the processed mixture on the positive electrode 110. The negative electrode 120 can also be formed with a similar method.

3. Electrolyte Solution

The electrolyte solution 140 includes the solvent and an electrolyte, and at least a part of the electrolyte is dissolved in the solvent and electrically dissociated. As the solvent, water and an organic solvent can be used. In the case where the secondary battery 100 is utilized as a nonaqueous electrolyte-solution secondary battery, an organic solvent is used. As an organic solvent, carbonates such as ethylene carbonate, propylene carbonate, dimethyl carbonate, diethyl carbonate, ethyl methyl carbonate, and 1,2-di(methoxycarbonyloxy)ethane; ethers such as 1,2-dimethoxyethane, 1,3-dimethoxypropane, tetrahydrofuran, and 2-methyltetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone, sulfur-containing compounds such as sulfolane, dimethyl sulfoxide, and 1,3-propanesultone, a fluorine-containing organic solvent in which fluorine is introduced to the aforementioned organic solvent; and the like are represented. A mixed solvent of these organic solvents may also be employed.

As a typical electrolyte, a lithium salt is represented. For example, $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, a lithium salt of a carboxylic acid having 2 to 6 carbon atoms, $LiAlCl_4$, and the like are represented. Just one kind of the lithium salts mentioned above may be used, and more than two kinds of lithium salts may be combined.

Note that, in a broad sense, an electrolyte may mean a solution of an electrolyte. However, in the present specification and claims, a narrow sense is employed. That is, an electrolyte is a solid and is electrically dissociated upon dissolving in a solvent to provide an ion conductivity to the resulting solution.

4. Fabrication Process of Secondary Battery

As shown in FIG. 1A, the negative electrode 120, the separator 130, and the positive electrode 110 are arranged to form a stacked body. After that, the stacked body is disposed in a housing which is not illustrated. The secondary battery 100 can be fabricated by filling the housing with the electrolyte solution and sealing the housing while reducing a pressure in the housing or by sealing the housing after filing the housing with the electrolyte solution while reducing a pressure in the housing. A shape of the secondary battery 100 is not limited and may be a thin-plate (paper) form, a disc form, a cylinder form, a prism form such as a rectangular parallelepiped, or the like.

Second Embodiment

In the present embodiment, a method for preparing the first layer 132 described in the First Embodiment is described. An explanation of the structures the same as those of the First Embodiment may be omitted.

A method for preparing the first layer 132 includes (1) a process for obtaining a polyolefin composite by kneading an ultrahigh-molecular weight polyethylene, a low-molecular weight polyolefin having a weight-average molecular weight of equal to or lower than 10,000, and a pore-forming agent, (2) a process for forming a sheet by rolling the polyolefin composite with a rolling roll (rolling process), (3) a process for removing the pore-forming agent from the sheet obtained in the process (2), and (4) a process for processing into a film state by stretching the sheet obtained in the process (3).

The pore-forming agent used in the process (1) may include an organic substance or an inorganic substance. As an organic substance, a plasticizer is represented. As a plasticizer, a low-molecular weight hydrocarbon such as a liquid paraffin is exemplified.

As an inorganic substance, an inorganic material soluble in a neutral, acidic, or alkaline solvent is represented, and calcium carbonate, magnesium carbonate, barium carbonate, and the like are exemplified. Other than these materials, an inorganic compound such as calcium chloride, sodium chloride, and magnesium sulfate is represented. Just one kind of the pore-forming agent may be used, or two or more kinds of pore-forming agents may be combined. Calcium carbonate is represented as a typical pore-forming agent.

In the process (3) in which the pore-forming agent is removed, a solution of water or organic solvent to which an acid or a base is added, or the like is used as a cleaning solution. A surfactant may be added to the cleaning solution. An addition amount of the surfactant can be arbitrarily selected from a range equal to or more than 0.1 wt % to 15 wt % or equal to or more than 0.1 wt % and equal to or less than 10 wt %. It is possible to secure a high cleaning efficiency and prevent the surfactant from being left by selecting the addition amount from this range. A cleaning temperature may be selected from a temperature range equal to or higher than 25° C. and equal to or lower than 60° C., equal to or higher than 30° C. and equal to or lower than 55° C., or equal to or higher than 35° C. and equal to or lower than 50° C., by which a high cleaning efficiency can be obtained and evaporation of the cleaning solution can be avoided.

In the process (3), water cleaning may be further conducted after removing the pore-forming agent with the cleaning solution. The temperature in the water cleaning may be selected from a temperature range equal to or higher than 25° C. and equal to or lower than 60° C., equal to or higher than 30° C. and equal to or lower than 55° C., or equal to or higher than 35° C. and equal to or lower than 50° C.

The pore structure of the first layer 132 is also influenced by the deforming rate at the stretching in the process (4) as well as the temperature of the thermal fixation treatment (annealing treatment), performed on the stretched film, per unit thickness of the stretched film (a thermal fixation temperature per unit thickness of the stretched film, which is, hereinafter, referred to as a thermal fixation temperature). Therefore, the structure of the pores in the first layer 132 can be controlled, and the range of the temperature-increase convergence time described in the First Embodiment can be satisfied by adjusting the deforming rate and the thermal fixation temperature.

Specifically, it is possible to obtain the first layer 132 by adjusting the stretching rate and the thermal fixation temperature within a range of a triangle having three vertexes of (500%/min, 1.5° C./μm), (900%/min, 14.0° C./μm), and (2500%/min, 11.0° C./μm) or a triangle having three vertexes of (600%/min, 5.0° C./μm), (900%/min, 12.5° C./μm), and (2500%/min, 11.0° C./μm).

Third Embodiment

In the present embodiment, an embodiment in which the separator 130 has the porous layer 134 in addition to the first layer 132 is explained.
1. Structure As described in the First Embodiment, the porous layer 134 may be disposed on one side or both sides of the first layer 132 (see FIG. 1 B). When the porous layer 134 is stacked on one side of the first layer 132, the porous layer 134 may be arranged on a side of the positive electrode 110 or on a side of the negative electrode 120 of the first layer 132.

The porous layer 134 is insoluble in the electrolyte solution 140 and is preferred to include a material chemically stable in a usage range of the second battery 100. As such a material, it is possible to represent a polyolefin such as polyethylene, polypropylene, polybutene, poly(ethylene-co-propylene); a fluorine-containing polymer such as poly(vinylidene fluoride) (PVDF), polytetrafluoroethylene, poly(vinylidene fluoride-co-hexafluoropropylene), and poly(tetrafluoroethylene-co-hexafluoropropylene); an aromatic polyamide (aramide); rubber such as poly(styrene-co-butadiene) and a hydride thereof, a copolymer of methacrylic esters, a poly(acrylonitrile-co-acrylic ester), a poly(styrene-co-acrylic ester), ethylene-propylene rubber, and poly(vinyl acetate); a polymer having a melting point and a glass-transition temperature of 180° C. or more, such as poly(phenylene ether), a polysulfone, a poly(ether sulfone), polyphenylenesulfide, a poly(ether imide), a polyamide-imide, a polyether-amide, and a polyester; a water-soluble polymer such as poly(vinyl alcohol), poly(ethylene glycol), a cellulose ether, sodium alginate, poly(acrylic acid), polyacrylamide, poly(methacrylic acid); and the like.

As an aromatic polyamide, poly(paraphenylene terephthalamide), poly(metaphenylene isophthalamide), poly(parabenzamide), poly(metabenzamide), poly(4,4'-benzanilide terephthalamide), poly(paraphenylene-4,4'-biphenylenecarboxylic amide), poly(metaphenylene-4,4'-biphenylenecarboxilic amide), poly(paraphenylenee-2,6-natphthalenedicarboxlic amide), poly(metaphenyelnee-2,6-natphthalenedicarboxlic amide), poly(2-chloroparaphenylene terephthalamide), a copolymer of paraphenylene terephthalamide with 2,6-dichloroparaphenylene terephthalamide, a copolymer of metaphenylene terephthalamide with 2,6-dichloroparaphenylene terephthalamide, and the like are represented, for example.

The porous layer 134 may include a filler. A filler consisting of an organic substance or an inorganic substance is represented as a filler. A filler called a filling agent and consisting of an inorganic substance is preferred. A filler consisting of an inorganic oxide such as silica, calcium oxide, magnesium oxide, titanium oxide, alumina, mica, zeolite, aluminum hydroxide, boehmite, and the like is more preferred, at least one kind of filler selected from a group consisting of silica, magnesium oxide, titanium oxide, aluminum hydroxide, boehmite, and alumina is further preferred, and alumina is especially preferred. Alumina has a number of crystal forms such as α-alumina, β-alumina, γ-alumina, θ-alumina, and the like, and any of the crystal forms can be appropriately used. Among them, a-alumina is most preferable due to its particularly high thermal stability and chemical stability. Just one kind of filler may be used, or two or more kinds of filler may be combined in the porous layer 134.

No limitation is provided to a shape of the filler, and the filler may have a sphere shape, a cylindrical shape, an elliptical shape, a gourd shape, and the like. Alternatively, a filler in which these shapes are mixed may be used.

When the porous layer 134 includes the filler, an amount of the filler to be included may be equal to or larger than 1 vol % and equal to or smaller than 99 vol % or equal to or larger than 5 vol % and equal to or smaller than 95 vol % with respect to the porous layer 134. The aforementioned range of the amount of the filler to be included prevents the space formed by contact between the fillers from being closed by the material of the porous layer 134, which leads to sufficient ion permeability and allows its weight per unit area to be adjusted.

A thickness of the porous layer 134 can be selected from a range equal to or larger than 0.5 μm and equal to or smaller than 15 μm or equal to or larger than 2 μm and equal to or smaller than 10 μm. Hence, when the porous layers 134 are formed on both sides of the first layer 132, a total thickness of the porous layers 134 may be selected from a range equal to or larger than 1.0 μm and equal to or smaller than 30 μm or equal to or larger than 4 μm and equal to or smaller than 20 μm.

When the total thickness of the porous layers 134 is arranged to be equal to or larger than 1.0 μm, internal short-circuits caused by damage to the secondary battery 100 can be more effectively prevented. The total thickness of the porous layers 134 equal to or smaller than 30 μm prevents an increase in permeation resistance of the carrier ions, thereby preventing deterioration of the positive electrode 110 and a decrease in battery performance and a cycle property resulting from an increase in permeation resistance of the carrier ions. Moreover, it is possible to avoid an increase in distance between the positive electrode 110 and the negative electrode 120, which contributes to miniaturization of the secondary battery 100.

The weight per unit area of the porous layer 134 may be selected from a range equal to or more than 1 g/m$^2$ and equal to or less than 20 g/m$^2$ or equal to or more than 2 g/m$^2$ and equal to or less than 10 g/m$^2$. This range increases an energy density per weight and energy density per volume of the secondary battery 100.

A porosity of the porous layer 134 may be equal to or more than 20 vol % and equal to or less than 90 vol % or equal to or more than 30 vol % and equal to or less than 80 vol %. This range allows the porous layer 134 to have sufficient ion permeability. An average porous diameter of the pores included in the porous layer 134 may be selected from a range equal to or larger than 0.01 μm and equal to or smaller than 1 μm or equal to or larger than 0.01 μm and equal to or smaller than 0.5 μm, by which a sufficient ion permeability is provided to the secondary battery 100 and the shutdown function can be improved.

A gas permeability of the separator 130 including the aforementioned first layer 132 and the porous layer 134 may be equal to or higher than 30 s/100 mL and equal to or lower than 1000 s/100 mL or equal to or higher than 50 s/100 mL and equal to or lower than 800 s/100 L in a Gurley value, which enables the separator 130 to have sufficient strength, maintain a high shape stability at a high temperature, and possess sufficient ion permeability.

Note that a temperature-increase convergence time of the separator 130 may be equal to or longer than 2.9 s·m$^2$/g and equal to or shorter than 5.7 s·m$^2$/g or equal to or longer than 2.9 s·m²/g and equal to or shorter than 5.3 s·m²/g, and a minimum height of a ball in the falling-ball test with respect to the separator 130 may be equal to or more than 50 cm and equal to or less than 150 cm.

2. Preparation Method

When the porous layer 134 including the filler is prepared, the aforementioned polymer or resin is dissolved or dispersed in a solvent, and then the filler is dispersed in this mixed liquid to form a dispersion (hereinafter, referred to as a coating liquid). As a solvent, water; an alcohol such as methyl alcohol, ethyl alcohol, n-propyl alcohol, isopropyl alcohol, and t-butyl alcohol; acetone, toluene, xylene, hexane, N-methylpyrrolidone, N,N-dimethylacetamide, N,N-dimethylformamide; and the like are represented. Just one kind of solvent may be used, or two or more kinds of solvents may be used.

When the coating liquid is prepared by dispersing the filler to the mixed liquid, a mechanical stirring method, an ultrasonic dispersing method, a high-pressure dispersion method, a media dispersion method, and the like may be applied. In addition, after the filler is dispersed in the mixed liquid, the filler may be subjected to wet milling by using a wet-milling apparatus.

An additive such as a dispersant, a plasticizer, a surfactant, or a pH-adjusting agent may be added to the coating liquid.

After the preparation of the coating liquid, the coating liquid is applied on the first layer 132. For example, the porous layer 134 can be formed over the first layer 132 by directly coating the first layer 132 with the coating liquid by using a dip-coating method, a spin-coating method, a printing method, a spraying method, or the like and then removing the solvent. Instead of directly applying the coating liquid over the first layer 132, the porous layer 134 may be transferred onto the first layer 132 after being formed on another supporting member. As a supporting member, a film made of a resin, a belt or drum made of a metal may be used.

Any method selected from natural drying, fan drying, heat drying, and vacuum drying may be used to remove the solvent. Drying may be conducted after substituting the solvent with another solvent (e.g., a solvent with a low boiling point). When heating, drying may be carried out at 10° C. or higher and 120° C. or lower or at 20° C. or higher and 80° C. or lower. This temperature range avoids a reduction in gas permeability caused by shrinkage of the pores in the first layer 132.

A thickness of the porous layer 134 can be controlled by a thickness of the coating film in a wet state after coating, an amount of the filler included, a concentration of the polymer and the resin, and the like.

EXAMPLES

1. Preparation of Separator

An example for preparing the separator 130 is described below. In the following Examples 1 to 3, the prepared first layers 132 were used as the separator 130.

1-1. Example 1

To a mixture of 68 wt % of ultrahigh-molecular weight polyethylene powder (GUR2024 manufactured by Ticona) and 32 wt % of polyethylene wax (FNP-0115, manufactured by Nippon Seiro Co. Ltd.) having a weight-average molecular weight of 1000, 0.4 weight portions of an antioxidant (Irg1010, manufactured by CIBA Speciality Chemicals), 0.1 weight portions of an antioxidant (P168 manufactured by CIBA Speciality Chemicals®), and 1.3 weight portions of sodium stearate with respect to 100 weight portions of the summation of the ultrahigh-molecular weight polyethylene and the polyethylene wax were added, calcium carbonate (manufactured by Maruo Calcium Co. LTD.) with an average particle diameter of 0.1 μm was further added as the pore-forming agent so that its proportion to the entire volume is 38 vol %. These materials were mixed in a power state with a Henschel mixer and then kneaded while melting in a twin-screw kneader to obtain a polyolefin-resin composite. The obtained polyolefin-resin composite was rolled using three rolling rollers R1, R2, and R3 having a surface temperature of 150° C., where a first rolling was carried out using the rollers R1 and R2 while a second rolling was carried out using the rollers R2 and R3. The polyolefin-resin composite was cooled stepwise while being drawn with a winding roller different in speed from the rolling rollers (drawing ratio (winding speed/rolling speed)=1.4), resulting in a sheet with a thickness of approximately 64 μm. This sheet was dipped in hydrochloric acid (4 mol/L) including 0.5 wt % of a nonionic surfactant to remove calcium carbonate, sequentially stretched to 6.2 times in a lateral direction at a deformation rate of 1250%/min at 100 to 105° C., and subjected to a thermal fixation treatment at 126° C. to obtain the separator 130. This first layer 132 was used as the separator 130.

1-2. Example 2

The separator 130 was obtained with the same method as the Example 1 except that 70 wt % of the ultrahigh-molecular weight polyethylene powder GUR4032 manufactured by Ticona was used, 30 wt % of the polyethylene wax was used, the calcium carbonate was used at 36 vol %, a sheet with a thickness of approximately 41 μm was prepared by rolling the mixture with a pair of rolling rollers having a surface temperature of 150 ° C., followed by cooling the mixture stepwise while being drawn with a winding roller different in speed from the rolling rollers (drawing ratio (winding speed/rolling speed)=1.4), and the thermal fixation treatment was carried out at 120° C.

1-3. Example 3

The separator 130 was obtained with the same method as the Example 1 except that 71.5 wt % of the ultrahigh-molecular weight polyethylene powder was used, 28.5 wt % of the polyethylene wax was used, the calcium carbonate was used at 37 vol %, a sheet with a thickness of approximately 70 μm was prepared by rolling the mixture with three rolling rollers R1, R2, and R3 having a surface temperature of 150 ° C., the polyolefin-resin composite was stretched to 7.0 times at a deformation rate of 2100%/min, and the thermal fixation treatment was carried out at 123° C.

An example for preparing separators used as Comparative Examples is described below. In the Comparative Examples 1 and 2, the prepared first layers 132 were used as the separator 130.

1-4. Comparative Example 1

To a mixture of 70 wt % of ultrahigh-molecular weight polyethylene powder (GUR4032 manufactured by Ticona) and 30 wt % of polyethylene wax (FNP-0115, manufactured by Nippon Seiro Co. Ltd.) having a weight-average molecular weight of 1000, 0.4 weight portions of an antioxidant (Irg1010, manufactured by CIBA Speciality Chemicals), 0.1 weight portions of an antioxidant (P168 manufactured by CIBA Speciality Chemicals®), and 1.3 weight portions of sodium stearate with respect to 100 weight portions of the summation of the ultrahigh-molecular weight polyethylene and the polyethylene wax were added, and calcium carbonate (manufactured by Maruo Calcium Co. LTD.) with an average particle diameter of 0.1 μm was further added as the pore-forming agent so that its proportion to the entire volume is 36 vol %. These materials were mixed with a Henschel mixer in a power state, and then kneaded while melting in a twin-screw kneader to obtain a polyolefin-resin composite. The obtained mixture was rolled with a pair of rolling rolls having a surface temperature of 150° C., cooled stepwise while being drawn with a winding roller different in speed from the rolling rollers (drawing ratio (winding speed/rolling speed)=1.4), resulting in a sheet with a thickness of approximately 29 μm. This sheet was dipped in hydrochloric acid (4 mol/L) including 0.5 wt % of a non-ionic surfactant to remove calcium carbonate, sequentially stretched to 6.2 times in a lateral direction at a deformation rate of 750%/min at 100 to 105° C. to obtain a film having a thickness of 16.3 μm. A thermal fixation treatment was further carried out on the film at f 115° C. to obtain the separator 132.

1-5. Comparative Example 2

A commercially available polyolefin porous film (polyolefin separator) was used as the separator of the Comparative Example.

2. Fabrication of Secondary Battery

A method for fabricating the secondary batteries including the separators of the Examples 1 to 3 and Comparative Examples 1 and 2 is described below.

2-1. Positive Electrode

A commercially available positive electrode manufactured by applying a stack of $LiNi_{0.5}Mn_{0.3}Co_{0.2}O_2$/conductive material/PVDF (weight ratio of 92/5/3) on an aluminum foil was processed. Here, $LiNi_{0.5}Mn_{0.3}Co_{0.2}O_2$ is an active-substance layer. Specifically, the aluminum foil was cut so that a size of the positive-electrode active-substance layer is 45 mm×30 mm and that a portion with a width of 13 mm, in which the positive-electrode active-substance layer is not formed, was left in a periphery and was used as a positive electrode in the following fabrication process. A thickness, a density, and a positive-electrode capacity of the positive-electrode active-substance layer were 58 μm, 2.50 g/cm$^3$, and 174 mAh/g, respectively.

2-2. Negative Electrode

A commercially available negative electrode manufactured by applying graphite/poly(styrene-co-1,3-butadiene)/carboxymethyl cellulose sodium salt (weight ratio of 98/1/1) on a copper foil was used. Here, the graphite functions as a negative-electrode active-substance layer. Specifically, the copper foil was cut so that a size of the negative-electrode active-substance layer is 50 mm×35 mm and that a portion with a width of 13 mm, in which the negative-electrode active-substance layer is not formed, was left in a periphery and was used as a negative electrode in the following fabrication process. A thickness, a density, and a negative-electrode capacity of the negative-electrode active-substance layer were 49 μm, 1.40 g/cm$^3$, and 372 mAh/g, respectively.

2-3. Fabrication

The positive electrode, the separator, and the negative electrode were stacked in the order in a laminated pouch to obtain a stacked body. At this time, the positive electrode and the negative electrode were arranged so that the entire top surface of the positive-electrode active-substance layer overlaps with a main surface of the negative-electrode active-substance layer.

Next, the stacked body was arranged in an envelope-shaped housing formed by stacking an aluminum layer and a heat-seal layer, and 0.25 mL of an electrolyte solution was added into the housing. A mixed solution in which $LiPF_6$ was dissolved at 1.0 mol/L in a mixed solvent of ethyl methyl carbonate, diethyl carbonate, and ethylene carbonate with a volume ratio of 50:20:30 was used as the electrolyte solution. The secondary battery was fabricated by heat-sealing the housing while reducing the pressure in the housing. A designed capacity of the secondary battery was 20.5 mAh.

3. Evaluation

The physical properties of the separators according to the Examples 1 to 3 and the Comparative Examples 1 and 2 as well as the evaluation results of the performance of the secondary batteries including the separators are described below.

3-1. Thickness

The thicknesses D were measured using a High-Resolution Digital Measuring Unit manufactured by Mitsutoyo Corporation.

3-2. Porosity

The first layer 132 was trimmed into a square with a side length of 10 cm, and its weight W (g) was measured. The porosity (vol %) was calculated from the thickness D (μm) and the weight W (g) according to the following equation, Porosity (vol %)=(1−(W/specific gravity)/(10×10×D/10000))×100 where the specific gravity is that of the ultrahigh-molecular weight polyethylene powder.

3-3. Temperature-Increase Convergence Time

After dipping the separator with a size of 8 cm×8 cm into a N-methylpyrrolidone to which 3 wt % of water was added, the separator was spread over a sheet of Teflon (™) (size: 12 cm×12 cm) and then folded in half to sandwich an optical fiber thermometer (Neoptix Reflex thermometer manufactured by ASTECH corporation.) wrapped with polytetrafluoroethylene.

Next, after the separator sandwiching the thermometer was fixed in a microwave-irradiation apparatus (9 kW microwave oven with a frequency of 2455 Hz, manufactured by Micro Denshi Co. Ltd.) equipped with a turning table, a microwave was applied at 1800 W for 2 minutes.

The temperature variation of the separator after starting the microwave irradiation was measured every 0.2 second using the aforementioned optical fiber thermometer. In this temperature measurement, the temperature at which no temperature increase was observed for 1 second or more was employed as the temperature-increase convergence temperature, and the time from starting the microwave irradiation until reaching the temperature-increase convergence temperature was used as a convergence time. The temperature-increase convergence time was calculated by dividing the convergence time by the weight per unit area of the separator.

3-4. Falling-Ball Test

Figure 2A:
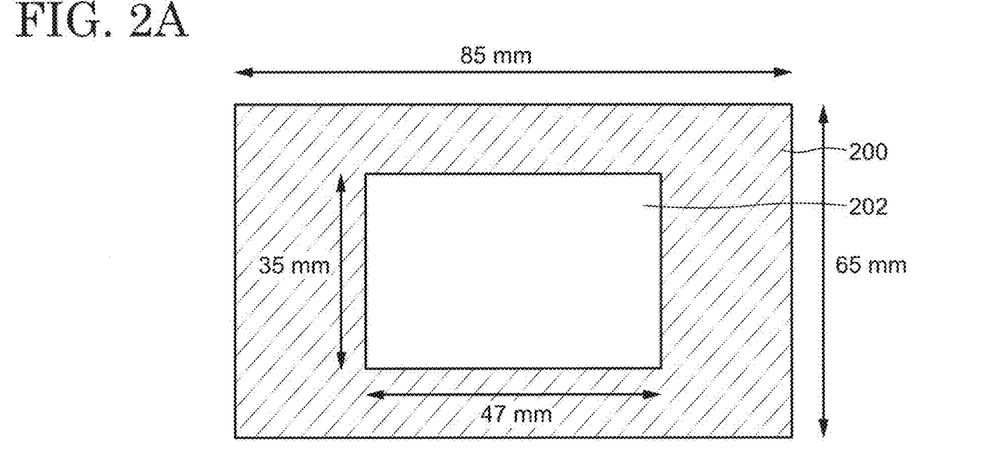
FIG. 2A to FIG. 2C are drawings showing the tools used in the falling-ball test.
Figure 2B:
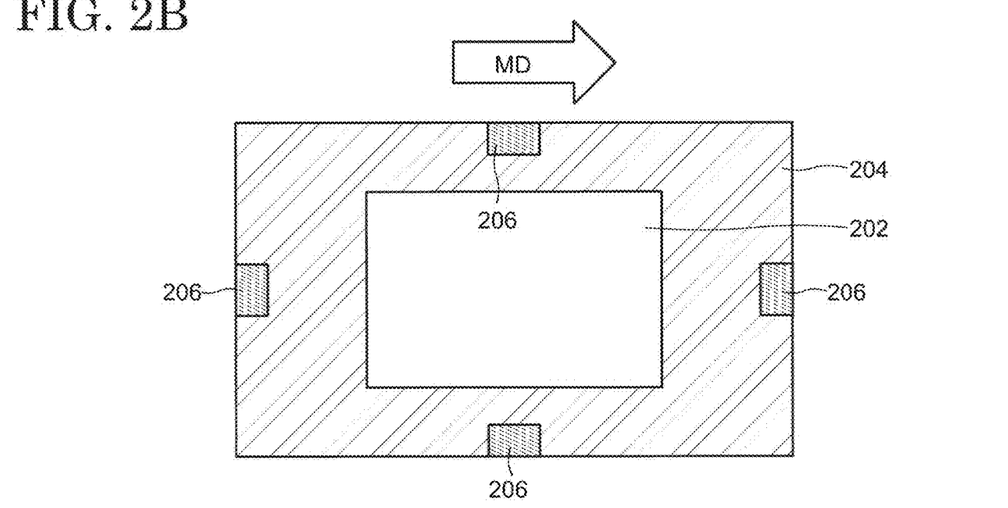
Figure 2C:
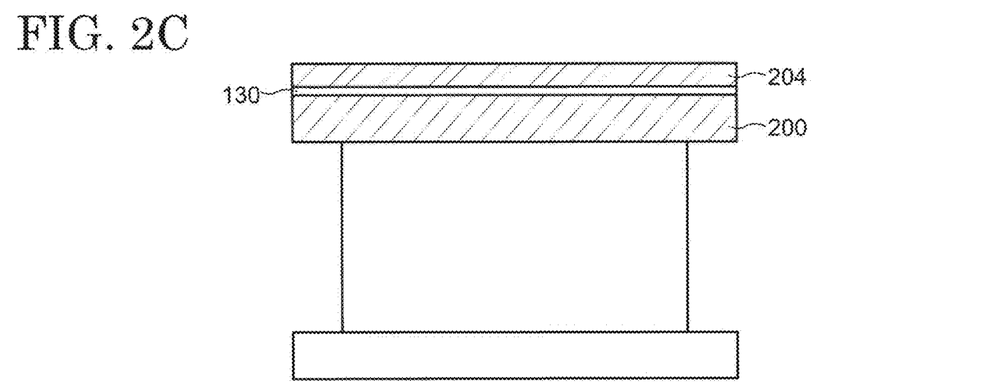

The tools used in the falling-ball test are illustrated in FIG. 2A to FIG. 2C. FIG. 2A is a top view of a frame 200 over which the separator 130 is placed, and FIG. 2B and FIG. 2C are respectively a top view and a side view of a state where the separator 130 and a SUS plate 204 are disposed over the frame 200. The frame 200 has an opening 202 of 47 mm×34 mm and has a rectangular shape of 85 nm×65 mm. The separator trimmed into a size of 85 mm×65 mm was placed over the frame 200 (FIG. 2C). At this time, the separator was placed so that the MD of the separator 130 is parallel to the longitudinal sides of the opening 202. Next, the SUS plate 204 having the same shape as the frame 200 was placed over the separator 130, and the frame 200 and the SUS plate 204 were fixed at around the center of each side using clamps (non-twist clamp) 206 as shown in FIG. 2B and FIG. 2C. As illustrated in FIG. 2C, the separator 130 was sandwiched by the frame 200 and the SUS plate 204.

In this state, a mirror-surface ball having a diameter of 14.3 mm, a weight of 11.9 g, and a surface roughness Ra of 0.016 μm was allowed to freely fall from over the opening, and then whether a break (split) occurred in the separator 130 was confirmed. This operation was carried out plural times, where a new separator 130 was used in every falling-ball test. Note that the surface roughness (Ra) of the ball was measured with a non-contact surface profiler system (VertScan (™) 2.0 R5500GML manufactured by Ryoka Systems Inc.) under the following conditions.

The height of the ball subjected to the free fall in the first falling-ball test, that is, the distance between the ball immediately prior to the free fall and the separator 130 was defined as h1. In the case where a break was observed in the separator 130 as a result of the first falling-ball test, the height of the ball h2 in the second falling-ball test was changed to (h1−5 cm), while the height of the ball h2 in the second falling-ball test was changed to (h1+5 cm) in the case where no break was observed in the separator 130. The falling-ball test was repeated by changing the height of the ball in this way. Namely, the height of the ball hk+1 in the (k+1)th falling-ball test was changed to (hk−5 cm) in the case where a break was observed in the separator 130 as an evaluation result of the kth (k is an integral equal to or larger than 1) falling-ball test performed by employing a distance hk between the separator 130 and the ball, while the height of the ball hk+1 was changed to (hk+5 cm) in the (k+1)th falling-ball test in the case where no break was observed. The falling-ball test was repeated until the number of the falling-ball tests in which the break was observed and the number of the falling-ball tests in which no break was observed each reached five, and the lowest height of the ball in the falling-ball test in which the break was observed was determined as the minimum height.

3-5. Trimming Processability

Figure 3A:
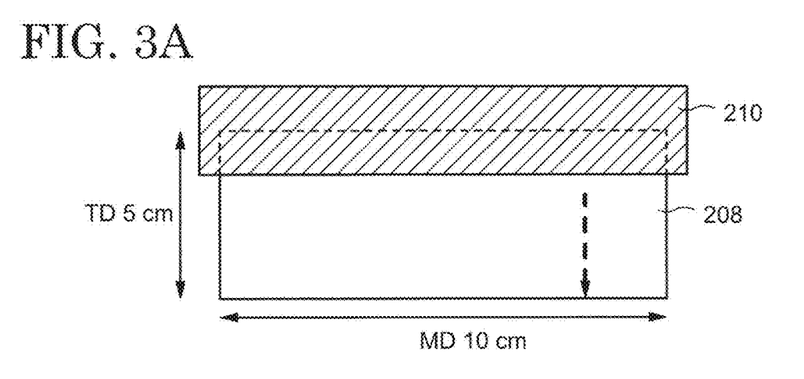
FIG. 3A and FIG. 3B are drawings showing an evaluation method of trimming processability.
Figure 3B:
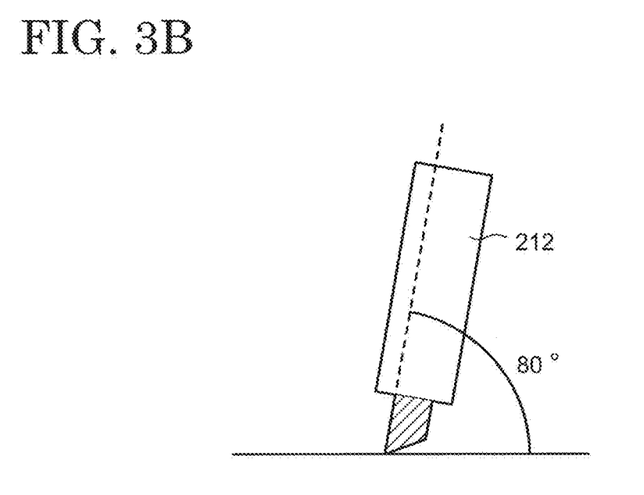

FIG. 3A and FIG. 3B show an evaluation method of the trimming processability. As illustrated in FIG. 3A, one longitudinal side of the separator 130 trimmed to have the MD of 10 cm and TD of 5 cm was fixed with a tape 210. Next, as shown in FIG. 5B, 3 cm of the separator 130 was cut by moving a cutter knife 212 parallel to the TD at a rate of approximately 8 cm/s while being maintained at 80° with respect to the horizontal direction, and then the cutting state was evaluated (see a dotted arrow in the drawing). A case where a split in an unintended direction (MD) was observed in the cut portion was evaluated as "−", while a case where no split was observed was evaluated as "+". A model A300 manufactured by NT Incorporated was used as the cutter knife 212, and a model Ma-44N was used as a cutting mat. The blade was replaced in every test, and a model BA-160 manufactured by NT Incorporated was used as a replaceable blade.

3-6. Pin-Extracting Test

The separator 130 was cut into a tape shape into the MD×TD of 62 mm×30 cm, and one terminal of the MD was attached to a scale weight of 300 g, while the other terminal was wound on a stainless-steel scale (model 13131 manufactured by Shinwa Rules Co., Ltd.) five times. The stainless-steel scale has a bent knob at a terminal in the longitudinal direction, and the separator 130 was wound so that the TD of the separator and the longitudinal direction of the stainless-steel scale are parallel to each other. After that, the stainless-steel scale was extracted toward the side on which the bent knob is formed at a rate of approximately 8 cm/s, and a feeling of easiness of extraction (extraction feeling) was evaluated. Specifically, a case where the scale was smoothly extracted without feeling any resistance was evaluated as "+", a case where a slight resistance was felt was evaluated as "±", and a case where a resistance was sensed and a hardness of extraction was felt was evaluated as "−".

The width of the portion of the TD of the separator 130 wound five times was measured with a caliper before and after extracting the stainless-steel scale, and a variation (mm) therebetween was calculated. This variation is an elongation of the separator in the extraction direction when the winding start of the separator moves in the extraction direction of the stainless-steel scale due to the friction between the stainless-steel scale and the separator 130 and the separator deforms into a helical shape.

3-7. Pin-Extracting Resistance

Figure 4A:
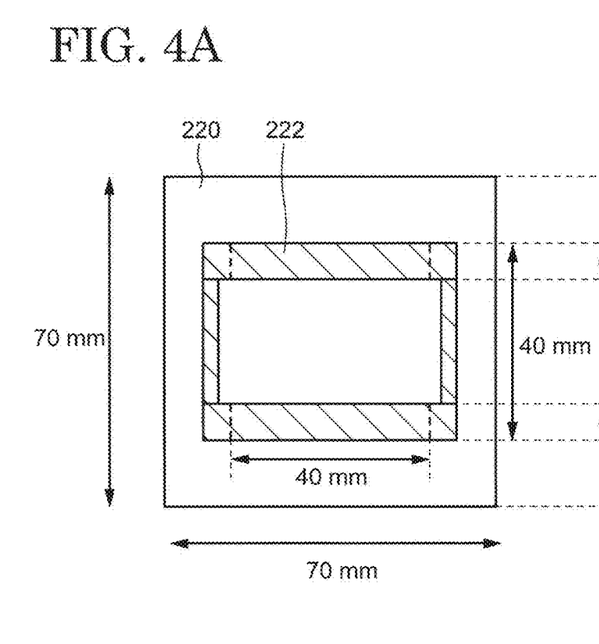
FIG. 4A and FIG. 4B are respectively a bottom view and a side view of a sledge for measuring a pin-extracting resistance.
Figure 4B:
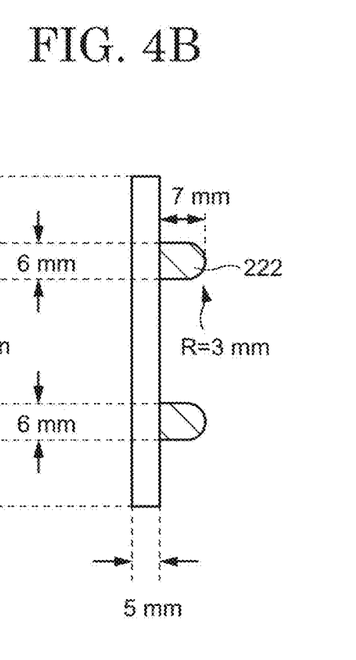

FIG. 4A and FIG. 4B are drawings showing a sledge 220 for measuring a pin-extracting resistance indicative of a magnitude of friction between the surface of the separator 130 and other members. FIG. 4A and FIG. 4B are respectively a bottom view and side view of the sledge. As shown in FIG. 4A, the sledge 220 has two protrusions 222 having a tip curvature of 3 mm on a bottom surface thereof. The protrusions are arranged parallel to each other with an interval of 28mm.

Figure 5:
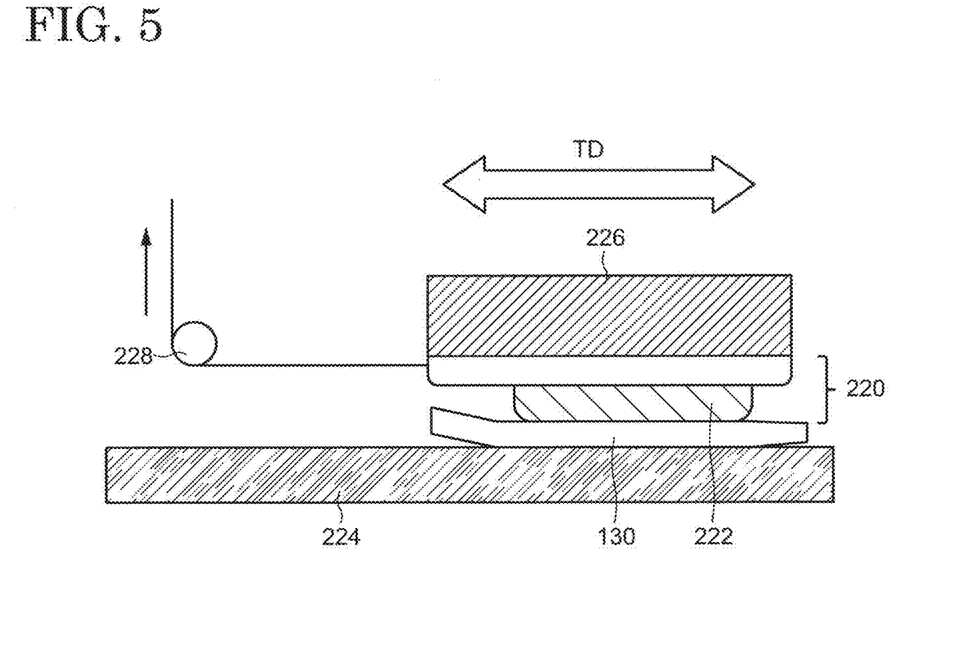
FIG. 5 is a drawing showing a measuring method of the pin-extracting resistance.

As illustrated in FIG. 5, the separator 130 was cut so as to have the TD of 6 cm and the MD of 5 cm, and the separator 130 was stuck to the protrusions 222 with a tape so that the TD of the separator 130 matches the direction of the protrusions 222.

Next, the sledge 220 having a lower surface stuck with the separator 130 was placed on a plate 224 processed with a fluorine resin (a plate subjected to SILVERSTONE (™) processing). A scale weight 226 was disposed on the sledge 220. A total weight of the scale weight 226 and the sledge 220 was 1800 g. As shown in FIG. 5, the separator 130 was arranged between the sledge 220 and the plate 224. The SILVERSTONE processing was performed on a plate of high-speed steel $SKH_{51}$ in HAKUSUI CO., LTD. The thickness of the SILVERSTONE processing was 20 to 30 μm, and the surface roughness Ra measured with a HANDYSURF (™) was 0.8 μm.

A string (Super Cast PE Tou No. 2 manufactured by SUNLINE CO, LTD.) was attached to the sledge 220, and the sledge 220 was pulled at a rate of 20 mm/min using an Autograph (model AG-I manufactured by Shimadzu Corporation) via a pully 228 to measure a tension thereof. This tension indicates the friction between the plate 224 and the separator 130. The pin-extracting resistance was calculated according to the following equation by using the tension F (N) at the 10 mm advanced point from the starting point of the measurement.

Pin-extracting resistance=F×1000/(9.80665/1800)

3-8. Rate Property After Charging/Discharging Cycle

The secondary battery 100 fabricated with the method described above was subjected to a four-cycle initial charging/discharging where one cycle is performed with a current of 0.2 C in a voltage range from 4.1 V to 2.7 V at 25° C.

The secondary batteries which was subjected to the initial charging/discharging was further subjected to three cycles of charging and discharging at a constant current with a charging current of 1 C and discharging currents of 0.2 C and 20 C at 55° C. After that, the secondary batteries were subjected to 100-cycle charging/discharging where one cycle was performed at a constant current with a charging current of 1 C and a discharging current of 10 C in a voltage range from 4.2 V to 2.7 V at 55° C. After that, three cycles of charging and discharging were carried out at a constant current with a charging current of 1 C and discharging currents of 0.2 C and 10 C at 55° C. A ratio of the discharge capacitances between at the discharge currents of 0.2 C and 10 C (10 C discharge capacitance/0.2 C discharge capacitance) in the third cycle were obtained as battery performance after the 100-cycle charging/discharging (battery performance after 100 cycles).

The properties of the separators of the Examples 1 to 3 and the Comparative Examples 1 and 2 as well as the performance of the secondary batteries fabricated using these separators are summarized in Table 1.

It was confirmed that the separators 130 of the Examples 1 to 3 have the temperature-increase convergence time equal to or longer than 2.9 s·m²/g and equal to or shorter than 5.7 s·m²/g and exhibit the minimum height in the falling-ball test equal to or more than 50 cm and equal to or less than 150 cm. On the other hand, although the separator of the Comparative Example 1 has the temperature-increase convergence time equal to or longer than 2.9 s·m²/g and equal to or shorter than 5.7 s·m²/g, the minimum height remains as low as 35 cm or less. It is considered that the proportion of the skin layer is lower in the Examples 1 to 3 than that in the Comparative Example 1 due to the large thicknesses of the first layers 132 at the time of rolling. It was also confirmed that the trimming processability and the extraction feeling are preferred and that the variation in the width after the extraction is as small as 0.04 mm or less in the Examples 1 to 3. This is probably because, as described above, the separators 130 of the Examples 1 to 3 have a smaller proportion of the skin layer than the separators 130 of the Comparative Example 1 so that the orientation balance between the MD and TD falls within an appropriate range. In contrast, it was proven that the pin-extracting resistance exceeds 0.1 N in the Comparative Examples 1 and 2. The pin-extracting resistance relates to the friction of the separator 130 and indicates the easiness of pin extraction when a wound secondary battery is fabricated. Hence, a decrease in the pin-extracting resistance improves the slip property with respect to the pin, which contributes to a reduction in a production takt time of a secondary battery.

Furthermore, the rate property after 100 cycles is high in the case of using the separators of the Examples 1 to 2 as shown in Table 1. Namely, it was proven that the use of the separators 130 of the Examples 1 to 3 allows the formation of the secondary batteries in which a decrease in battery performance caused by repeating charging/discharging is suppressed. On the other hand, a maintenance rate of battery performance was found to be low in the case of using the separator 130 of the Comparative Example 1 in which the minimum height remains as low as 35 cm while the temperature-increase convergence time is equal to or longer than 2.9 s·m²/g and equal to or shorter than 5.7 s·m²/g. Moreover, it was found that the maintenance rate of battery performance further decreases in the case of using the separator 130 of the Comparative Example 2 having the temperature-increase convergence time which does not satisfy the range of equal to or longer than 2.9 s·m²/g and equal to or shorter than 5.7 s·m²/g and exhibiting the minimum

TABLE 1

Properties of separator and performance of secondary battery

| | Separator | | | | | | Pin-extracting test | | Secondary battery |
|---|---|---|---|---|---|---|---|---|---|
| | First layer | | temperature-increase convergence time (s · m²/g) | Minimum height (cm) | Trimming processability | Extraction feeling | Variation in width after extraction (mm) | Pin-extracting resistance | Rate property after 100 cycles (10C/0.2C) |
| | Thickness (mm) | Porosity | | | | | | | |
| Example 1 | 11 | 38 | 3.1 | 65 | + | + | 0.03 | 0.093 | 85.6% |
| Example 2 | 17 | 53 | 3.0 | 115 | + | + | 0.04 | 0.083 | 87.8% |
| Example 3 | 12 | 50 | 5.3 | 80 | + | + | 0.01 | 0.088 | 88.8% |
| Comparative Example 1 | 17 | 65 | 5.6 | 35 | + | ± | 0.20 | 0.172 | 84.6% |
| Comparative Example 2 | 26 | 42 | 1.9 | 35 | − | − | 0.31 | 0.154 | 62.3% | height less than 35 cm. A battery-performance maintaining property is a standard indicative of tolerance of a secondary battery to discharging at a large current and is expressed by a proportion of a discharge capacitance in discharging a secondary battery at a large current with respect to a discharge capacitance in discharging the secondary battery at a small current. A high maintenance rate of battery performance means an excellent battery-performance maintaining property and is indicative of an excellent output property of a battery.

Therefore, it was found that a secondary battery having a high battery-performance maintaining property can be produced in a short manufacturing takt time at a high yield by using the separator having the temperature-increase convergence time of equal to or longer than 2.9 s·m$^2$/g and equal to or shorter than 5.7 s·m$^2$/g and exhibiting the minimum height in the falling-ball test of equal to or more than 50 cm and equal to or less than 150 cm. Hence, implementation of the embodiment of the present invention provides a secondary battery from which a large current can be rapidly extracted at high producibility.

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements is included in the scope of the present invention as long as it possesses the concept of the present invention.

It is understood that another effect different from that provided by the modes of the aforementioned embodiments is achieved by the present invention if the effect is obvious from the description in the specification or readily conceived by persons ordinarily skilled in the art.

EXPLANATION OF REFERENCE NUMERAL

100: Secondary battery, 110: Positive electrode, 112: Positive-electrode current collector, 114: Positive-electrode active-substance layer, 120: Negative electrode, 122: Negative-electrode current collector, 124: Negative-electrode active-substance layer, 130: Separator, 132: First layer, 134: Porous layer, 140: Electrolyte solution, 200: Frame, 202: Opening, 204: Plate, 206: Clamp, 210: Tape, 232: Cutter Knife, 220: Sledge, 222: Protrusion, 224: Plate, 228: Pully

The invention claimed is:

1. A separator comprising:
    a first layer consisting of a porous polyolefin, having a temperature-increase convergence time equal to or longer than 2.9 s·m$^2$/g and equal to or shorter than 5.7 s·m$^2$/g when the first layer is irradiated with a microwave having a frequency of 2455 MHz and an output power of 1800 W after dipping the first layer in N-methylpyrrolidone containing 3 wt % of water,
    wherein a minimum height of a ball placed over the first layer and having a diameter of 14.3 mm and a weight of 11.9 g is equal to or more than 50 cm and equal to or less than 150 cm, the minimum height causing a split in the first layer when the ball freely falls on the first layer.

2. The separator according to claim 1,
    wherein a thickness of the separator is equal to or larger than 4 μm and equal to or smaller than 20 μm.

3. The separator according to claim 1,
    wherein a porosity of the separator is equal to or more than 20 vol % and equal to or less than 55 vol %.

4. The separator according to claim 1,
    wherein the temperature-increase convergence time is equal to or longer than 2.9 s·m$^2$/g and equal to or shorter than 5.3 s·m$^2$/g.

5. The separator according to claim 1, further comprising a porous layer over the first layer.

6. The separator according to claim 1, further comprising a pair of porous layers sandwiching the first layer.

7. A secondary battery comprising the separator according to claim 1.

* * * * *